Sept. 20, 1966     G. L. CARSON     3,273,935
AUTOMOBILE COMPARTMENT LOCK MEANS
Filed Nov. 13, 1964
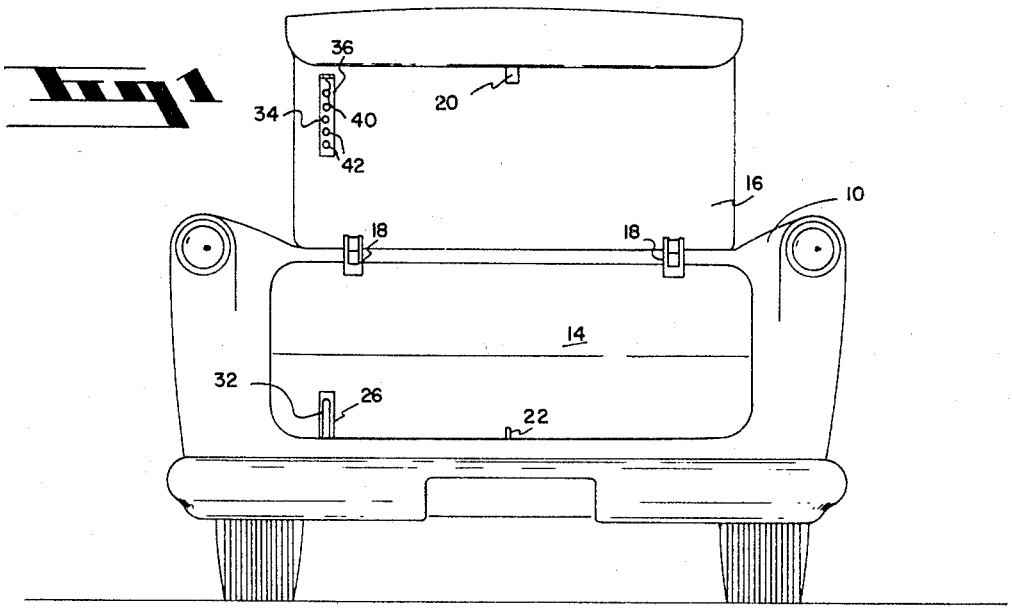
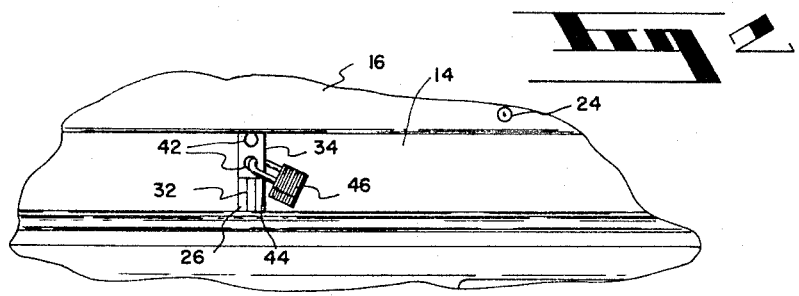
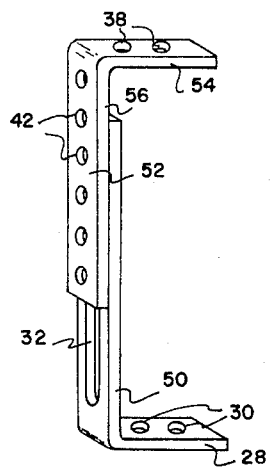
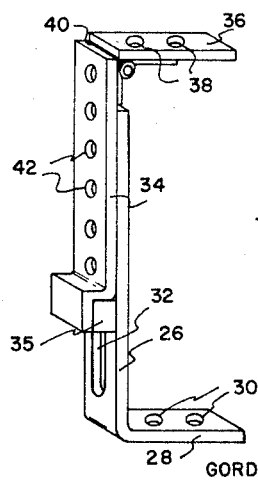
INVENTOR.
GORDON L. CARSON
BY
*Wm. H. Dean*

3,273,935
AUTOMOBILE COMPARTMENT LOCK MEANS
Gordon L. Carson, 1829 E. Thomas Road, Apt. 41,
Phoenix, Ariz.
Filed Nov. 13, 1964, Ser. No. 411,023
5 Claims. (Cl. 296—76)

This invention relates to an automobile compartment lock means and more particularly to an automobile compartment lock means adapted to provide primary and auxiliary lock means for securely locking trunk compartments or engine compartments of vehicles to thereby prevent unauthorized entrance to such compartments.

Pilferage and vandalism have been serious problems confronting motorists and vehicle owners. In many instances, the conventional locks on automobile trunk compartments and engine compartments have been released or broken and pilferage or vandalism has occurred.

Accordingly, it is an object of the present invention to provide an automobile compartment lock means which provides an auxiliary locking facility in addition to conventional automobile compartment lock means, thereby tending to discourage and prevent pilferage or vandalism relative to contents of a vehicle or features of the vehicle.

Another object of the invention is to provide a very simple and economical automobile compartment lock means, including auxiliary lock means which may very conveniently and readily be installed internally of compartments to thereby permit only partial opening of the compartment and access to an auxiliary lock after the conventional or existing lock means of the compartment has either failed or been opened, whereby the auxiliary lock means constitutes a bar to ordinary tampering or pilferage attempts.

Another object of the invention is to provide an automobile compartment lock means which is very useful to persons carrying valuables in compartments of vehicles.

Another object of the invention is to provide a very simple automobile compartment lock means which is very simple to install in connection with the floor and cover or the super structure and cover of automobile or vehicle compartments.

Another object of the invention is to provide a novel automobile compartment lock means in which an auxiliary lock is connected to a pair of straps, one of which is connected to the vehicle body and the other to a compartment cover, wherein an elongated slot in one of the straps permits partial opening movement of the cover relative to the vehicle body compartment so that a person from the outside of the compartment may gain partial access to the inside in order to release the auxiliary lock means in an authorized manner.

A further object of the invention is to provide a very simple auxiliary lock means for automobile compartments employing simple strap structures which may readily be fabricated and one of which may be pivotally mounted inside a vehicle compartment to provide for adjustable alignment of one of the straps relative to the other for attachment of an auxiliary lock means thereto and also to permit relative slidable movement of the auxiliary lock means in a longitudinally slotted portion of one of the strap means; said slotted portion being disposed substantially vertically to accommodate a partial opening movement of a compartment cover hinged upon a substantially horizontal axis.

Further objects and advantages of the present invention may be apparent from the following specification, appended claims and accompanying drawings, in which:

FIG. 1 is a rearend view of an automobile, showing a trunk compartment and a cover therefor hinged on a substantially horizontal axis to the body of the vehicle and wherein the cover is pivoted upwardly into fully open position with respect to the compartment of the vehicle and further showing an auxiliary lock means of the present invention in connection with the cover and the body of the vehicle;

FIG. 2 is an enlarged fragmentary rear view of the vehicle, as shown in FIG. 1, but showing the compartment cover of the vehicle in partially open position and limited to such partially open position by an auxiliary lock means of the invention attached to the vehicle body and the cover of the compartment thereof;

FIG. 3 is a perspective view of a pair of strap structures of the automobile compartment lock means of the invention; and FIG. 4 is a view similar to FIG. 3, but showing a modification of the strap structures forming parts of the automobile compartment lock means of the invention.

As shown in FIG. 1 of the drawings, a rearward portion 10 of a conventional vehicle body 12 comprises a compartment 14 adapted to be closed on the upper side thereof by means of a conventional cover 16 pivoted to the body on hinges 18 having substantially horizontally disposed axes. Secured to the cover 16 is one element 20 cooperable with a secondary element 22 of a conventional trunk cover lock means. These elements 20 and 22, when properly engaged, serves to lock the cover 20 downwardly into closed position over the compartment 14. A conventional tumbler lock 24, shown in FIG. 2 of the drawings, is disposed to actuate the lock means 20 to release it from the lock means 22, thus, forming the conventional lock or primary lock for the cover 16 over the compartment 14.

In accordance with the present invention and as shown in FIG. 3, a secondary or auxiliary lock means is provided and includes a strap 26 having a substantially horizontally disposed fixture portion 28 which, by means of holes 30, receives bolts to secure the strap 26 in position, as shown in FIG. 1 of the drawings, said bolts passing through the openings 30 and the floor of the compartment 14. Thus, the strap 26 is held in substantially vertical position and is provided with a vertically disposed longitudinal slot 32 through which a member of an auxiliary lock means may be inserted, as will be hereinafter described in detail.

Another portion of the auxiliary lock means comprises a secondary strap 34 having a fixture portion 36 provided with openings 38 therein through which bolts may be secured to fix the strap 34 to the cover 16 or the compartment 14, as shown in FIG. 1 of the drawings. A hinge 40 interconnects the fixture portion 36 with the strap portion 34 so that anyone of a series of openings 42 extending through the strap portion 34 may be aligned with the slot 32 to thereby receive a loop member 44 of a conventional padlock 46, as shown in FIG. 2 of the drawings. Said loop portion 44 extending through one of the openings 42 and through the slot 32 in the strap portions 34 and 26, respectively.

A magnet or other fixture device 35 on the strap 34 may hold the strap 34 against the compartment cover 16 when the locking means of the invention is not in use. In this position, the strap is held out of the way in the compartment.

From an inspection of FIGS. 1 and 2 of the drawings, it will be seen that the loop member 44 of the padlock 46 may slide up and down in the slot 32 permitting the cover 16 over the compartment 14 to be moved downwardly from a position, as shown in FIG. 2 to a fully closed position in which the lock portions 20 and 22 are fully engaged in the conventional manner.

In the event an unauthorized person tampers with the lock 24 and manages to disengage the lock portion 20 from the lock portion 22, the auxiliary lock means constituting the padlock 46 with its loop member 44 through the slot 32 and one of the openings 42, permits the cover 16 to be moved upwardly a limited distance, as shown in FIG. 2, which prevents substantial access to the compartment 14 and also such limited upward movement of the cover 16 prevents the removal of any substantial articles from the compartment 14 and prevents anyone from reaching to the forward portion of such a compartment so that any valuables may be kept in the frontal portion of the compartment remote from the straps 26 and 34. Thus, a person intending to pilfer or vandalize material in the compartment 16 is limited by the padlock 46 and the straps 26 and 34 which prevent substantial opening of the cover 16 over the compartment 14.

A modification of the invention is disclosed in FIG. 4, wherein straps 50 and 52 correspond with the hereinbefore described straps 26 and 34. The strap 50 is identical to the strap 26 and the strap 52 is provided with a fixture portion 54 similar to the fixture portion 36, hereinbefore described, and the strap 52 is provided with a vertical element 56 integral with the fixture 54 and this portion 56 is not hinged, thus, the hinge 40 is eliminated in the modified structure, as shown in FIG. 4. Otherwise, all of the features of the modified structure are similar to the features of the structure described in FIG. 3 of the drawings.

It will be obvious to those skilled in the art that various modifications of the present invention may be resorted to in a manner limited only by a just interpretation of the following claims.

I claim:

1. In an automobile trunk lock means the combination of: an automobile body; a trunk compartment in the rearward portion thereof; a compartment cover horizontally pivotally mounted on said body and disposed to pivot upwardly into open position relative to said compartment; lock means accessible externally of said compartment and disposed to lock said cover in downwardly closed fixed position; second lock means disposed and connected to said body and said cover to permit only partial upward opening movement of said cover relative to said body; a first strap of said second lock means secured to said body; a second strap secured to said cover; one of said straps having an elongated slot therein disposed generally in a vertical direction; auxiliary lock means interconnecting said first and second straps; a member of said auxiliary lock means in said slot and relatively slidable longitudinally therein to permit a limited relative movable connected relation between said first and second straps, said first and second straps and said auxiliary lock means disposed inside said compartment whereby the release or failure of said first mentioned lock means may permit only partial opening of said cover relative to said compartment and to thereby provide access of a person externally of said compartment to said auxiliary lock means internally of said compartment.

2. In an automobile trunk lock means the combination of: an automobile body; a trunk compartment in the rearward portion thereof; a compartment cover horizontally pivotally mounted on said body and disposed to pivot upwardly into open position relative to said compartment; lock means accessible externally of said compartment and disposed to lock said cover in downwardly closed fixed position; second lock means disposed and connected to said body and said cover to permit only partial upward opening movement of said cover relative to said body; a first strap of said second lock means secured to said body; a second strap secured to said cover; one of said straps having an elongated slot therein disposed generally in a vertical direction; auxiliary lock means interconnected said first and second straps; a member of said auxiliary lock means in said slot and relatively slidable longitudinally therein to permit a limited relative movable connected relation between said first and second straps, said first and second straps and said auxiliary lock means disposed inside said compartment whereby the release or failure of said first mentioned lock means may permit only partial opening of said cover relative to said compartment and to thereby provide access of a person externally of said compartment to said auxiliary lock means internally of said compartment; one of said straps having a secured portion; and a hinged portion of said last mentioned strap hingedly connected to said secured portion to thereby permit alignment adjustment of said hinged portion of said one strap with the other remaining one of said first or second straps.

3. In an automobile trunk lock means the combination of: an automobile body; a trunk compartment in the rearward portion thereof; a compartment cover horizontally pivotally mounted on said body and disposed to pivot upwardly into open position relative to said compartment; lock means accessible externally of said compartment and disposed to lock said cover in downwardly closed fixed position; second lock means disposed and connected to said body and said cover to permit only partial upward opening movement of said cover relative to said body; a first strap of said second lock means secured to said body; a second strap secured to said cover; one of said straps having an elongated slot therein disposed generally in a vertical direction; auxiliary lock means interconnected said first and second straps; a member of said auxiliary lock means in said slot and relatively slidable longitudinally therein to permit a limited relative movable connected relation between said first and second straps, said first and second straps and said auxiliary lock means disposed inside said compartment whereby the release or failure of said first mentioned lock means may permit only partial opening of said cover relative to said compartment and to thereby provide access of a person externally of said compartment to said auxiliary lock means internally of said compartment; one of said straps having a secured portion; and a hinged portion of said last mentioned strap hingedly connected to said secured portion to thereby permit alignment adjustment of said hinged portion of said one strap with the other remaining one of said first or second straps; detent means on said hinge portion tending to hold it in fixed position and tending to prevent pivotal movement about its hinged axis.

4. In an automobile trunk lock means the combination of: an automobile body; a compartment structure in said automobile body; a compartment cover horizontally pivotally mounted on said body and disposed to pivot upwardly into open position relative to said compartment; lock means accessible externally of said compartment and disposed to lock said cover in downwardly closed fixed position; second lock means disposed and connected to said body and said cover to permit only partial upward opening movement of said cover relative to said body; a first strap of said second lock means secured to said body; a second strap secured to said cover; one of said straps having an elongated slot therein disposed generally in a vertical direction; auxiliary lock means interconnecting said first and second straps; a member of said auxiliary means in said slot and relatively slidable longitudinally therein to provide a limited relatively movable connected relation between said first and second straps; said first and second straps and said auxiliary lock means disposed inside said compartment whereby the release or failure of said first mentioned lock means may permit only partial opening of said cover relative to said compartment to thereby provide access of a person externally of said compartment to said auxiliary lock means internally of said compartment.

5. In an automobile compartment lock means the combination of: an automobile body; a compartment means therein; a compartment cover horizontally pivotally mounted on said body and disposed to pivot upwardly into open position relative to said compartment; lock means accessible externally of said compartment and disposed to lock said cover in downwardly closed fixed position; second lock means disposed and connected to said body and said cover to permit only partial upward opening movement of said cover relative to said compartment; a first strap of said second lock means secured to said body; a second strap secured to said cover; one of said straps having an elongated slot therein disposed generally in a vertical direction; and one of said straps having a plurality of openings spaced longitudinally thereof; auxiliary lock means interconnecting said first and second straps; a member of said auxiliary lock means in said slot and in one of said openings and relatively slidable longitudinally in said slot to provide a limited relative movably connected relation between said first and second straps; said first and second straps and said auxiliary lock means disposed inside said compartment whereby the release or failure of said first mentioned lock means may permit only partial opening of said cover relative to said compartment and thereby provide access of a person externally of said compartment to said auxiliary lock means internally of said compartment.

References Cited by the Examiner

UNITED STATES PATENTS

| | | | |
|---|---|---|---|
| 2,537,380 | 1/1951 | Travis | 292—288 |
| 2,912,268 | 11/1959 | Markovich | 292—262 |
| 3,115,764 | 12/1963 | Kraver | 70—240 |

BENJAMIN HERSH, *Primary Examiner.*

J. H. BRANNEN, *Assistant Examiner.*